(12) United States Patent
Dino et al.

(10) Patent No.: US 6,462,096 B1
(45) Date of Patent: Oct. 8, 2002

(54) ORGANOPHILIC CLAY ADDITIVES AND OIL WELL DRILLING FLUIDS WITH LESS TEMPERATURE DEPENDENT RHEOLOGICAL PROPERTIES CONTAINING SAID ADDITIVES

(75) Inventors: David Dino, Cranbury; Jeffrey Thompson, Hightstown, both of NJ (US)

(73) Assignee: Elementis Specialties, Inc., Hightstown, NJ (US)

( * ) Notice: Subject to any disclaimer, the term of this patent is extended or adjusted under 35 U.S.C. 154(b) by 0 days.

(21) Appl. No.: 09/535,549

(22) Filed: Mar. 27, 2000

(51) Int. Cl.$^7$ ............................. C09K 7/00; B01D 21/01
(52) U.S. Cl. ...................... 516/101; 507/100; 507/140; 507/901; 501/146
(58) Field of Search ................ 516/101; 501/146; 507/100, 99, 140

(56) References Cited

U.S. PATENT DOCUMENTS

| | | | | |
|---|---|---|---|---|
| 4,434,076 A | * | 2/1984 | Mardis et al. | 507/901 |
| 4,464,274 A | * | 8/1984 | House | 507/100 |
| 4,517,112 A | * | 5/1985 | Mardis et al. | 507/901 |
| 4,664,820 A | * | 5/1987 | Magauran et al. | 507/100 |
| 5,075,033 A | * | 12/1991 | Cody et al. | 516/101 |
| 5,336,647 A | * | 8/1994 | Nae et al. | 501/146 |
| 5,718,841 A | * | 2/1998 | Mardis et al. | 516/101 |
| 6,130,256 A | * | 10/2000 | Nae | 507/901 |
| 6,172,121 B1 | * | 1/2001 | Chaiko | 516/101 |
| 6,187,719 B1 | * | 2/2001 | Dino et al. | 507/138 |

* cited by examiner

*Primary Examiner*—Philip Tucker
(74) *Attorney, Agent, or Firm*—Michael J. Cronin

(57) ABSTRACT

Conventional organophilic clays, when used as rheological additives in oil based invert muds, display marked viscosity loses in the mud when these muds are heated much above 350° F., whereas muds prepared according to the present invention are dramatically more viscosity stable at temperatures through 500° F. The present invention relates to the discovery of oil based invert emulsion drilling fluids that provides more stable drilling fluid viscosity and anti-settling performance over varying temperatures when compared to conventional fluids containing organoclays. As a result, the inventive fluids of this invention are ideal candidates for high temperature applications. This invention in another aspect of this invention is a process for improving the rheological properties of oil well drilling fluids particularly useful for oil-based invert emulsion types of drilling fluids. The new process uses as a rheological viscosifer for such fluids as a specific organoclay which when added to a drilling fluid at from about 0.5 and 5% by weight creates an inventive drilling fluid composition less sensitive to the very hot temperatures found in the drilling hole, and in the long stem of drilling pipe.

16 Claims, No Drawings

ORGANOPHILIC CLAY ADDITIVES AND OIL WELL DRILLING FLUIDS WITH LESS TEMPERATURE DEPENDENT RHEOLOGICAL PROPERTIES CONTAINING SAID ADDITIVES

BACKGROUND OF THE INVENTION

1. Field of the Invention

The present invention relates to improved oil based well bore fluids known in the oil service industry as drilling fluids, and, in particular, to oil based invert emulsion types of drilling fluids in which water is dispersed in an oil-based medium, which fluids contain defined organoclays. Organoclays are also often referred to as organophilic clay gellants.

In an important aspect the invention relates to novel organophilic clay gellants and to improved oil based drilling fluids containing such organoclays; in still another aspect the invention is directed to processes for providing less temperature dependent viscosity and other rheological properties to such fluids over the wide, and often very high, temperature ranges found in more recent drilling operations.

2. Description of the Prior Art

Oil Well Drilling Fluids

The American oil producing industry has used drilling fluids since the very beginning of oil well drilling operations in the United States. Drilling fluids and their chemistry have been an important area for scientific investigation and contained innovation from the beginning up to the present day.

Such drilling fluids in modern practice are pumped under great pressure through a long "string" of pipe previously placed into the ground after drilling, then (at the very bottom of the drill hole) through the center of the drilling bit, being then returned up through the small space between the outside of the drill pipes and the borehole wall itself. Drilling base fluids, the liquid carriers of the system, are often comprised of oils (diesel, mineral and poly(alpha-olefin)), propylene glycol, methyl glucoside, modified esters and ethers, water, and emulsions of oil and water of varying proportions.

A drilling fluid is a thixotropic system; that is, it exhibits low viscosity when sheared, such as on agitation or circulation (as by pumping) but, when such shearing action is halted, the fluid thickens to hold cuttings in place. The fluid must become thick rapidly, reaching a sufficient gel strength before suspended materials fall any significant distance—and this behavior must be totally reversible at all temperatures encountered. In addition, when a free-flowing liquid, the fluid must retain a sufficiently high viscosity to carry all unwanted particulate matter from the bottom of the hole back up to the surface.

A drilling fluid must accomplish a number of these interrelated functions over a wide range of temperatures to satisfy the requirements to be a commercial drilling fluid. To maintain these functions under the very hot temperatures encountered in modern drilling has proved extremely difficult with the use of commercial rheological drilling fluid additives presently available on the market. These functions can be grouped as follows:

(1) The fluid must constantly lubricate the drill bit so as to promote drilling efficiency and retard bit wear,
(2) The fluid must have a proper thickness or viscosity to meet the many different criteria required by the drill owner/operator,
(3) The fluid must provide filtration control,
(4) The fluid must suspend and transport solid particles such as weighting agents (to increase specific gravity of the mud; generally barytes; a barium sulfate ore, ground to a fine particle size) when drilling is interrupted, and
(5) The fluid must control formation pressure.

The above functions must be satisfactorily provided throughout the time the fluid is in the entire length of the drill hole. Since the drill hole can be as much as tens of thousands of feet long, varying extreme hot and cold temperatures are encountered, which hot temperature changes can particularly affect the fluid's physical properties and performance. Different measures of control during drilling can occur because of high ranges of a) encountered temperature (as high as 250° C.), b) time durations, c) pressures (from only a few bars to those exerted by a column of fluid that can extend for thousands of feet) and d) drilling directions (from vertical to horizontal).

Finally, it should be noted that a drilling fluid must perform its various functions not only when the drill bit is actively encountering the bottom of the borehole, but also at all times and at all locations in the well bore.

One of the principal problems facing "mud chemistry" scientists is the production of thickening agents, thixotropes and drilling fluids having satisfactory dispersibility, with the necessary subsidiary thixotropic properties discussed above, while at the same time possessing critically important rheological properties over a wide range of temperatures. While the compositions of these various fluids is considered a "black art", in reality, fluids and their additives involve highly complex chemical, and rheological analysis using intricate chemical and mathematical calculations, modeling and rheological analysis.

Accordingly, searches have been going on for many years for improved additives for modifying and controlling the viscosity properties of drilling fluids that would be efficient, easily handled, and readily dispersible in a broad range of drilling muds, and be usable when high temperature are expected to be encountered.

Temperature Sensitivity

In modern times, hydrocarbon drilling for exploratory and production wells has increasingly been done from platforms located in water settings, often called off-shore drilling. Such fresh and salt water drilling employ floating barges and rigs fixed in some fashion to the submerged surface of the earth.

Economic and technical advances have recently pushed these drilling operations into harsher environments. Although advances in equipment and engineering have yielded technology capable of drilling in water depths up to 10,000 feet or more, advances required in drilling fluid technology have lagged.

One important area of application for the new drilling fluid systems is in geothermal drilling, particularly when a well is drilled at an angle other than vertical. The aim of the invention is particularly to make available industrially usable drilling fluids with enhanced properties over a large and "hot" temperature range. The systems can be put to use in land-based drilling operations as well as offshore operations.

Drilling fluids with enhanced temperature properties have become both more important and complex over the past decade as a result of changes in directional drilling technology. Such wells are also known as deviated wells, the extent of the angle of deviation can be from a few degrees to horizontal.

Use of a downhole motor allows the hole to be deviated by the introduction of a fixed offset or bend just above the drill bit. This offset or bend can be oriented by modern MWD systems which are capable of reporting accurately the current bit and toolface hole angle and azimuth (i.e. the orientation with respect to the upper portion of the hole). It is accordingly possible to rotate the drill string until the toolface has achieved the desired direction of deviation, and then to fix the drill string in place and commence the deviation by starting the motor to extend the hole in the desired deviated direction.

Methods for deviating wells have changed greatly over recent years with the production of more powerful and reliable downhole motors, and the invention of more accurate techniques utilizing wireline techniques as well as the highly computerized downhole, sensing and micro reduction equipment, including improvements in sounding apparatus and microwave transmission.

Organoclays

It has been long known that organoclays can be used to thicken organic compositions and particularly drilling fluids. See J. W. Jordan, "Proceedings of the 10$^{th}$ National Conference on Clays and Clay Minerals" (1963) which discusses a wide range of applications of organoclays from high polarity liquids to low polarity liquids.

The efficiency of some organophilic clays in non-aqueous systems can be further improved by adding a low molecular weight polar organic material to the composition. Such polar organic materials have been called dispersants, dispersion aids, solvating agents and the like. See, for example, U.S. Pat. Nos. 2,677,661; 2,704,276; 2,833,720; 2,879,229; and 3,294,683.

Furthermore, U.S. Pat. Nos. 3,977,894; 4,382,686; 4,464,274; and 4,664,820 describe the preparation of preactivated organophilic clay gellants that are used to thicken organic compositions wherein the activators are admixed with the organophilic clay.

More recently, organophilic clay gellants have been developed which are the reaction products of smectite-type clays having a cation exchange capacity with certain organic cations or organic cations and organic anion combinations. These gellants have the advantage of being effectively dispersible in particular organic compositions without the need for a dispersion aid under normal shear conditions. Illustrative patents which describe such improved organophilic clay gellants are U.S. Pat. Nos. 4,105,578; 4,208,218; 4,287,086; 4,391,637; 4,410,364; 4,412,018; 4,434,075; 4,434,076; 4,450,095; and 4,517,112.

French language European Patent Application 0,133,071 describes more dispersible modified organophilic clays useful as rheological additives for non-aqueous systems resulting from the reaction of a smectite clay, including bentonitle and hectorite, and two nitrogenous surfactants. The first surfactant can be a quaternary salt such as a dialkyl benzyl methyl ammonium chloride. The second surfactant is a hydroxylated nitrogenous organic surfactant and are either ethoxylated amines and mono or polyhydroxylated quaternary ammonium chloride salts. The two salts are added in excess of the cation exchange capacity of the clay to improve dispersion and to eliminate the need for a polar activator to activate dispersion of the resulting organoclay in non-aqueous formulations. The patent teaches the two salts can be added in either order or as a mixture to an aqueous suspension of the smectite clay.

U.S. Pat. No. 4,677,158 describes a reaction product of a smectite clay (examples show Wyoming bentonite) and a specific quaternary ammonium compound that is used as a thickener for aqueous suspensions, particularly water based latex paints and caulks. The disclosed quaternary ammonium compound is described as consisting of a nitrogen atom bonded to separate carbon chains where one chain can be a methyl group or alkyl group containing 10 to 20 carbon atoms, the second chain an alkyl group containing from 10 to 22 carbon atoms with the third and fourth chains being polyoxyethylene chains where the total number of ethylene oxide units is from 5 to 200 moles. The patent further teaches that the second chain can also be a polyoxyethylene chain.

U.S. Pat. No. 5,336,647, issued to the assignee hereof, discloses organophilic clays made by reacting smectite-type clays including bentonite and hectorite with a mixture of two organic cations, one of which is a polyalkoxylated quaternary ammonium salt. The patent teaches that the polyalkoxylated quaternary salt should be present in an amount of from about 0.01% to about 20% by weight of the total organic cation content. The patent teaches said products are useful as rheological additives for oil base drilling fluids.

U.S. Pat. No. 5,728,764 discloses organoclay compositions made using a defined alkoxylated quaternary ammonium compound which is useful for the preparation of aqueous systems.

Oil based drilling fluids particularly those containing conventional organophilic clay rheological additives suffer considerable viscosity loss as the drilling fluid is heated from a temperature of 120° C. to 175° C., for example. Much above 175° C., a drilling fluid using conventional organophillic clays for viscosity build can consume as much as three times the clay content to maintain suitable viscosity for cuttings transport alone. Much above 200° C., alternatives to organoclays such as asphalt muds have been considered necessary—such muds however have an even wider variety of problems.

In summary, the disadvantages of existing organoclay compositions for non-aqueous systems are that they provide less effective rheology as temperatures increase and often totally fail at temperature around 350 and 400° F.

The invention herein discloses new oil based drilling fluids using specific organoclays, particularly oil invert drilling muds, which are distinguished by improved rheological properties at elevated temperatures, high ecological acceptability, and at the same time good application properties upon initial make-up.

SUMMARY OF THE INVENTION

The present invention relates to the discovery of novel organoclays and oil based drilling fluids containing such organoclays, particularly oil based invert emulsion drilling fluids, that provide more stable drilling fluid viscosity in temperatures in excess of 175° C. when compared to conventional fluids containing the specific organoclays as the rheological additive. The present invention also involves a process for providing rheology and anti-settling properties to oil based drilling fluids by adding to such fluid systems specific organoclays as rheological additives. The invention also includes novel drilling fluids containing such rheological additives.

DESCRIPTION OF THE PREFERRED EMBODIMENTS

The fluids of this invention will be used primarily as oil based drilling fluids and most particularly for oil based invert emulsion drilling fluids employed in high temperature drilling applications, although they could also find utility in a wide range of other oil based drilling fluids. The term oil based drilling fluid is defined as a drilling fluid in which the continuous phase is hydrocarbon based. Oil based fluids formulated with over 5% water are classified as oil based invert emulsion drilling fluids. Commonly, oil based invert emulsion drilling fluids will contain water as the discontinuous phase in any proportion up to about 50%.

Unlike the specific organoclays useful in the invention hereof, oil based invert muds thickened with conventional organophilic clays undergo marked viscosity changes in the mud when these muds are heated much above 175° C., whereas muds prepared according to the present invention are dramatically more viscosity stable over the same temperature ranges. As a result, the fluids of this invention are ideal candidates for increased temperature applications such as geothermal drilling and directional drilling.

The preferred well bore fluids of the invention are oil based drilling fluids, most preferably oil based invert emulsions. The term oil based drilling fluids are defined as a hydrocarbon based drilling fluids. Oil based invert emulsions have an oil "continuous" phase and an aqueous internal phase. The term "emulsion" is commonly used to describe systems in which water is the external or continuous phase and oil is dispersed within the external phase. By the term "invert" is meant that the hydrocarbon —oil substance is the continuous or external phase and that an aqueous fluid is the internal phase.

Water in the form of brine is often used in forming the internal phase of these type fluids. Water can be defined as an aqueous solution which can contain from about 10 to 350,000 parts per million of metal ions such as lithium, sodium, potassium, magnesium, or calcium ions. The preferred brines used to form the internal phase of the preferred fluid of the invention contain from about 5 to about 35% (saturated) by weight calcium chloride and may contain various amounts of other dissolved salts such as sodium bicarbonate, sodium sulfate, sodium acetate, sodium borate, potassium chloride, or sodium chloride.

The ratio of water (brine) to oil in the emulsions of the invention should generally provide as high a brine content as possible while still maintaining a stable emulsion since a high water content drilling fluid is less expensive and less objectionable to work with than a drilling fluid containing a low water content. Oil/brine ratios in the range from about 95 to 5 to 50 to 50 have been found to work satisfactorily, depending upon the particular oil chosen. Thus the water content of a typical drilling fluid prepared according to the teachings of the invention will have an aqueous (water) content of about 0 to 50 volume percent, with the most preferred range being about 10 to 30 volume percent, most preferably about 20 volume percent of the drilling fluid.

In order to form a stable emulsion, a surfactant or emulsifier can also be added to the external, the internal or both phases. The emulsifier is preferably selected from a number of organic acids which are familiar to those skilled in the drilling fluid area, including the monocarboxyl alkanoic, alkenoic, or alkynoic fatty acids containing from 3 to 20 carbon atoms, and mixtures thereof. Examples of this group of acids include stearic, oleic, caproic, capric and butyric acids. Adipic acid, a member of the aliphatic dicarboxylic acids can also be, used. More preferred surfactants or emulsifiers include lime, fatty acid calcium salts and lecithin.

Weighting materials are also used to weight the well bore fluids of the invention to a density in the preferred range from about 8 pounds per gallon to 18 pounds per gallon and greater. Weighting materials well known in the art include barite, ilmenite, calcium carbonate, iron oxide and lead sulfide. The preferred weighting material is commercially available barite.

According to one aspect of the invention, an organophilic clay is preferred which comprises the reaction product of:
a) hectorite clay having a cation exchange capacity of at least 75 milliequivalents per 100 grams of clay, 100% active clay basis; and
b) a first organic cation provided by an alkoxylated quaternary ammonium salt; and
c) a second organic cation wherein such second organic cation is not an alkoxylated quaternary ammonium salt.
wherein the second organic cation is present in an amount of from about 25% to about 75% by weight of the total organic cation content and the total amount of organic cations b) and c) is about equal to the cation exchange capacity of the hectorite clay.

The invention uses the above organoclay in an inventive drilling fluid composition thickened with the above-indicated organophilic clay gellants.

An important aspect of the invention therefore relates to a drilling fluid system which comprises:
a) an oil-based drilling fluid composition; and
b) an organophilic clay gellant comprising the reaction product of:
i) hectorite clay having a cation exchange capacity of at least 75 milliequivalents per 100 grams of clay, 100% active clay basis; and
ii) a first organic cation provided by an alkoxylated quaternary ammonium salt; and
iii) a second organic cation wherein such second organic cation is not an alkoxylated quaternary ammonium salt
wherein the second organic cation is present in an amount of from about 25% to about 75% by weight of the total organic cation content and the total amount of b)ii) and b)iii) is about equal to the cation exchange capacity of the hectorite clay.

Preferred oil based drilling fluid compositions are oil based invert emulsion fluids.

The organoclays useful in this invention are the reaction products of hectorite clays and defined quaternary compounds. Hectorite clay is well-known in the art and are commercially available from several sources including Rheox, Inc., an Elementis Specialties company and IMV, a Nevada Corporation.

The clays which may be used in the present invention to prepare the organoclay component of the inventive drilling fluid are hectorite clays having a cationic exchange capacity of at least 75 milliequivalents per 100 grams of clay, 100% active clay basis, as determined by the well-known ammonium acetate or methylene blue methods.

A representative formula for clays useful in accordance with the present invention is the following:

Hectorite

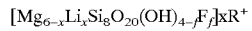

where $0.57 \leq x \leq 1.15$, $f \leq 4$ and R is selected from the group consisting of Na, Li, $NH_4$, and mixtures thereof;

The preferred clay used in the present invention to make the organoclay used in this invention is beneficated hectorite although synthetic and other forms of hectorites can also be used. A description of hectorite can be found in *Clay Mineralogy* by Ralph E. Grim, $2^{nd}$ Edition (published by McGraw Hill).

It will be understood that both sheared and non-sheared forms of the above-listed clays may be employed. In addition, the hectorite clay employed can be either crude (containing gangue or non-clay material) or beneficiated (gangue removed). The ability to use crude clay as the clay for this invention represents a substantial cost savings, since a clay beneficiation process and does not have to be carried out.

The instant invention is based on the unexpected discovery that organoclays made with specific organic cations provides improved viscosity stability at elevated temperatures to oil-based drilling systems, as well as easier dispersibility upon make-up.

The cationic organic salts which are important to this invention may be selected from a variety of materials that are capable of forming an organoclay by exchange of cations with the hectorite clay. The organic cations which are reacted with the hectorite clay must have a positive charge localized on a single atom or on a small group of atoms within the compound. The cation may be provided by compounds selected from the group consisting of quaternary ammonium salts, phosphonium salts, sulfonium salts and mixtures thereof.

The first organic cation is an alkoxylated quaternary ammonium salt, this salt can preferably be provided by a compound selected from the group having the following formulae:

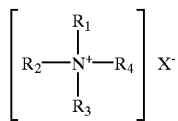

where $R_1$=a $C_{12}$ to $C_{18}$ linear alkyl group, $R_2$=$R_1$ or methyl, $R_3$=methyl or $R_4$, and $R_4$=$(CH_2-CH_2O)_yH$ where y=4 to 12 and $X^-$ is chloride.

The raw materials used to make the first quaternary ammonium compounds can be derived from natural oils such as tallow, soya, coconut and palm oil.

The hydroxyalkyl groups may be derived from a large variety of starting materials containing a hydroxyl substituted aliphatic radicals wherein the hydroxyl is not located at the carbon atom adjacent to the positively charged atom; the group; has from 2 to 6 aliphatic carbon atoms. The alkyl group may be substituted with an aromatic ring independently from the 2 to 6 aliphatic carbons. Representative examples include 2-hydroxyethyl; 3-hydroxypropyl; 4-hydroxypentyl; 6-hydroxyhexyl; 2-hydroxypropyl; 2-hydroxybutyl; 2-hydroxypentyl; 2-hydroxyhexyl; 2-hydroxycyclohexyl; 3-hydroxycyclohexyl; 4-hydroxycyclohexyl; 2-hydroxycyclopentyl; 3-hydroxycyclopentyl, 2-methyl-2-hydroxypropyl; 1,1,2-trimethyl-2-hydroxypropyl; 2-phenyl-2-hydroxyethyl; 3-methyl-2-hydroxyputyl; and 5-hydroxy-2-pentenyl.

Illustrative examples of suitable alkoxylated quaternary ammonium chloride compounds include those available under the tradename Ethoquad from Akzo Chemie America, for example, methyl bis(2-hydroxyethyl) cocoalkyl ammonium chloride, methyl bis(polyoxyethylene [15]) cocoalkyl quaternary ammonium chloride, methyl bis(2-hydroxyethyl) oleyl ammonium chloride, methyl bis(polyoxyethylene [15]) oleyl quatemrary ammonium chloride, and methyl bis(polyoxyethylene [15]) octadecyl quaternary ammonium chloride, wherein the numbers in brackets refer to the total number of ethylene oxide units. Particularly useful is Ethoquad 18/25.

The second organic cation is one or more quaternary ammonium compounds readily available in the market place which are not alkoxylated quaternary ammonium salts.

Particularly useful as quaternary ammonium compounds are those having the formula:

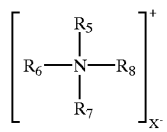

wherein $R_5$ comprises a group selected from linear or branched aliphatic, aralkyl, or aromatic hydrocarbon groups having from 8 to 30 carbon atoms or alkyl-ester groups having 8 to 30 carbon atoms; $R_6$, $R_7$, and $R_8$ are independently selected from the group consisting of (a) linear or branched aliphatic hydrocarbon, fluorocarbon, or other halocarbon groups having from 1 to about 30 carbon atoms; (b) aralkyl or aromatic groups having from 6 to about 30 carbon atoms, (c) amide groups, (d) oxazolidine groups, (e) allyl, vinyl, or other alkenyl or alkynyl groups possessing reactive unsaturation and having from 2 to about 30 carbon atoms, (f) hydrogen and (g) esters; and $X^-$ comprises an anion selected from the group consisting of chloride, methyl sulfate, acetate, iodide, and bromide, preferably chloride. For purposes of this invention, quaternary phosphonium and sulfonium based salts are defined as within the definition of quaternary ammonium compound.

The raw materials used to make these quaternary ammonium compounds can be derived from natural oils such as tallow, soya, coconut and palm oil. Useful aliphatic groups in the above formula may be derived from other naturally occurring oils including various vegetable oils, such as corn oil, coconut oil, soybean oil, cottonseed oil, castor oil and the like, as well as various animal oils or fats. The aliphatic groups may likewise be petrochemically derived from, for example, alpha olefins. Representative examples of useful branched, saturated radicals included 12-methylstearyl and 12-ethylstearyl.

Examples of useful aromatic groups include benzyl and benzylic-type materials derived from benzyl halides, benzhydryl halides, trityl halides, halo-phenylalkanes wherein the alkyl chain has from 1 to 30 carbon atoms, such as 1-halo-1-phenyloctadecane; substituted benzyl moieties, such as those derived from ortho-, meta-, and para-chlorobenzyl halides, para-methoxybenzyl halides, ortho-, meta-, and para-nitrilobenzyl halides, and ortho-, meta-, and para-alkylbenzyl halides wherein the alkyl chain contains from 1 to 30 carbon atoms; and fused ring benzyl-type moieties, such as those derived from 2-halomethylnaphthalene, 9-halomethylanthracene, and 9-halomethylphenanthrene, wherein the halo group comprises chloro, bromo, or any other such group which serves as a leaving group in the nucleophilic attack of the benzyl type moiety by a nitrogen atom to generate a substituted amine.

Examples of other aromatic groups include aromatic-type substituents such as phenyl and substituted phenyl; N-alkyl and N,N-dialklyl anilines, where the alkyl groups contain between 1 and 30 carbon atoms; ortho-, meta-, and para-nitrophenyl, ortho-, meta-, and para-alkyl phenyl, wherein the alkyl group contains between 1 and 30 carbon atoms; 2-,3-, and 4-halophenyl wherein the halo group is defined as chloro, bromo, or iodo; and 2-, 3-, and 4-carboxyphenyl and esters thereof, where the alcohol of the ester is derived from an alkyl alcohol, wherein the alkyl group contains between 1 and 30 carbon atoms, aryl such as phenol, or aralkyl such as benzyl alcohols; and fused ring aryl moieties such as naphthalene, anthracene, and phenanthrene.

Preferred quaternary ammonium compounds for purposes of the invention comprise a quaternary ammonium salt that contains at least one, preferably two or three, hydrocarbon chains having from about 8 to about 30 carbon atoms and either methyl or benzyl.

Some examples of particularly preferred quaternary ammonium compounds to make the compositions of this invention are: dimethyl bis[hydrogenated tallow] ammonium chloride (2M2HT), methyl benzyl bis[hydrogenated tallow] ammonium chloride (MB2HT), and methyl tris [hydrogenated tallow alkyl] chloride (M3HT).

Compounds useful for the second organic cation are manufactured by Akzo Nobel, CECA (a French chemical company), Witco Corporation and KAO Chemical Company of Japan.

Also very useful are commercial products which are pre-mixed two organic cation fluids containing both of the two types of quatemaries described above. Particularly useful is Varisoft 5TD made by Goldschmidt, a mixture of alkoxylated and non-alkoxylated quats of the above described types within the range specified; the particular Varisoft 5TD range is approximately 1 part non-alkoxylated quaternary to 2 parts alkoxylated quaterriary—this range was found particularly effective.

The preparation of the organic salts can be achieved by techniques well-known in the art. The first quaternary compounds of this invention can typically be prepared by reacting primary or secondary amines with alkylene oxides, such as ethylene and propylene oxide, followed by quaternization. For example, when preparing a quaternary ammonium salt, one skilled in the art may prepare a dialkyl secondary amine, for example, by the hydrogenation of nitriles, see U.S. Pat. No. 2,355,356, and then form the alkoxylated dialkyl tertiary amine by reaction with alkylene oxides such as ethylene and propylene oxides.

Illustrative of the numerous patents which generally describe organic cationic salts, their manner of preparation and their use in the preparation of organophilic clays are commonly assigned U.S. Pat. Nos. 2,966,506; 4,081,496, 4,105,578; 4,116,866; 4,208,218; 4,391,637; 4,410,364; 4,412,018; 4,434,075; 4,434,076; 4,450,095 and 4,517,112; the contents of which are incorporated herein by reference.

The clay is preferably dispersed in water at a concentration of from about 0.5 to 80%, most preferably from about 2 to 8% by weight.

To achieve shearing of the hectorite clay, the clay is typically dispersed in water at a concentration of from about 0.5 to about 80% by weight. The slurry may optionally be first centrifuged to remove non-clay impurities which constitute about 2% to about 70% of the starting clay composition. Of course, if the clay has previously been treated, such as by the clay vendor, to remove the impurities, the treated clay can be formed into a slurry and subjected to shear conditions. Shear can be imparted to the hectorite clay slurry by means of commercially available equipment that is known to impart high shear to the material. Illustrative of such equipment are a Manton-Gaulon Homogenizer available from Manton-Gaulon Company, a Tekmar SD-45 Homogenizer available from Tekmar Company, a Sharples Super Centrifuge available from Sharples Division of Pennwalt Corporation, an Oakes mill available from Oakes Machinery, a Waring Blendor available from Waring Products, a Microfluidizer available from Microfluidics Corporation, a division of Biotechnology Corporation, and similar devices which can impart high laminar and turbulent shear to the clay slurry. Exemplary condition s using a Manton-Gaulon homogenizer is a pressure in the range from about 500 to about 8,000 psi with one or more passes of the clay slurry trough the homogenizer. Representative processes for shearing clay slurries are described in U.S. Pat. Nos. 4,695,402 and 4,743,098, both of which are herein incorporated by reference.

The organoclay can be prepared by admixing a hectorite clay, the (two) quaternary ammonium compound(s) and water together, preferably at temperatures with the range of from 20° C. to 100° C., and most preferably from 35° C. to 80° C., for a period of time sufficient for the organic compounds to react with the clay. The reaction is followed by filtering, washing, drying and grinding the organoclay product.

The organophilic clay gellants prepared according to this invention are used as rheological additives in drilling fluid compositions such oil base drilling fluids or invert emulsion drilling fluids. These fluids are prepared by any conventional drilling fluid method including colloid mills, roller mills, ball mills, high and low speed dispersers. Consequently, the invention also provides non-aqueous solvent compositions thickened with the above-indicated organophilic clay gellant.

The organophilic clays useful in the invention are added to the drilling fluid compositions in amounts sufficient to obtain the desired-rheological properties. Amounts of the organophilic clay gellant to be added are from about 0.01% to 15%, preferably from about 0.3% to 5%, based on the total weight of the fluid system.

In one embodiment the present invention provides a process for providing less temperature dependent rheological properties to an oil based drilling fluid of the type used in high temperature drilling operations comprising:
(1) preparing an oil based, including an invert emulsion, drilling fluid base composition; and
(2) incorporating into such an oil based drilling fluid base or invert emulsion composition; one or more organoclays made as described above.

The method of this invention may find utility to prepare other non-aqueous fluid systems where improved viscosity stability over a range of temperatures is required.

In a preferred embodiment the present invention involves an oil based or invert emulsion drilling fluid comprising:
(3) an oil based drilling fluid base composition; and
(4) one or more organoclays made as described herein.

Component a), an oil based or invert emulsion drilling fluid base composition, is a drilling fluid composition in which the continuous phase is hydrocarbon-based. Oil based fluids formulated with over 5% water are defined for purpose of this invention as oil based invert emulsion drilling fluids.

The preferred base fluid compositions of this invention are oil based invert emulsions. Such fluids have an oil "continuous" phase and an aqueous internal phase.

Commonly, oil based invert emulsion drilling fluids will contain water as the discontinuous phase in any proportion up to about 50%. For background the term "emulsion" is commonly used to describe systems in which water is the external or continuous phase and oil is dispersed within the external phase. By the term "invert" is meant that the hydrocarbon—oil substance is the continuous or external phase and that an aqueous fluid is the internal phase. Water in the form of brine is often used in forming the internal phase of these type base fluids.

A number of other additives besides rheological additives regulating viscosity and anti-settling properties, providing other properties, can be used in the fluid so as to obtain desired application properties, such as, for example, emulsifiers or emulsifier systems, weighting agents, fluid loss-prevention additives and wetting additives.

The fluids of this invention can be prepared by simple dry blending the organophilic clay or clays at the proper weight ratio into the drilling fluid or powdered components can be added separately to the fluid.

A process for preparing invert emulsion drilling fluids (oil muds) involves using a mixing device to incorporate the individual components making up that fluid. Primary and secondary emulsifiers and wetting agents (surfactant mix) are added to the base oil (continuous phase) under moderate agitation. The water phase, typically a brine, is added to the base oil/surfactant mix along with alkalinity control agents and acid gas scavengers. Rheological additives as well as fluid loss control materials, weighting agents and corrosion inhibition chemicals are also included, and the agitation continued to ensure dispersion of each ingredient and homogenate of the resulting fluidizied mixture.

As discussed herein, the use of the term oil based or invert emulsion drilling fluid base composition is defined to mean the base oil plus all other ingredients making up the drilling mud except for the organoclay rheological agent. Note that the order of addition of the rheological additive can be strictly random, e.g. the organoclay rheological additive may be pre-blended with other ingredients before incorporation or added by itself Such products can be added to the base drilling fluid using the wide variety of mixing manufacturing techniques known to the art and to technicians working in the field.

Drilling fluids of this invention display lessened viscosity losses as the drilling fluid is heated above a temperature of 175° C.

The following examples are illustrations designed to assist those skilled in the drilling fluid art to practice the present invention, but are not intended to limit the wide scope of the invention. Various modifications and changes can be made without departing from the essence and spirit of the invention. The various chemicals used in the examples are commercial materials, except for the inventive drilling fluids.

EXAMPLE 1

Drilling fluids were prepared as per standard API procedures using formulations described on Tables 1 through 3. After all materials were incorporated each sample was sheared for an additional 20 minutes prior to measuring viscosities at 120° F. After the rheological profile was measured, each sample was dynamically heat aged at temperatures ranging from 300° F. through 550° F. (50° F. intervals). After cooling, and remixing for 10 minutes rheological properties were measured. After adding 4 pounds/barrel lime to each sample, the samples were sheared for 5 additional minutes prior to hot rolling. Table 1 shows the results using standard organophilic clay. Table 2 and 3 show results for compositions of the invention.

TABLE 1

Additive: Bentone 38 Organoclay (commercial hectorite-based product of Rheox, Inc. made using only the second organic cation described above).

| Formulation Used | Lbs/BBL |
|---|---|
| IAO (C16–C18 Blend) | 186 |
| Invermul NT | 4 |
| EZ Mul NT | 8 |
| Brine (30%) | 75 |
| Lime | 4 |
| Bentone 38 | 12 |
| Barite | 215 |

TEST RESULTS

| OFI 800 Viscosity @ 120° F. | Initial | HR 300° F. | HR 350° F. | HR 400° F. | HR 450° F. |
|---|---|---|---|---|---|
| 600 RPM READING, cPs | 106 | 102 | 95 | 48 | 41 |
| 300 RPM READING, cPs | 74 | 67 | 51 | 27 | 20 |
| 200 RPM READING, cPs | 62 | 54 | 37 | 18 | 13 |
| 100 RPM READING, cPs | 48 | 39 | 22 | 10 | 6 |
| 6 RPM READING, cPs | 26 | 20 | 5 | 2 | 1 |
| 3 RPM READING, cPs | 24 | 18 | 4 | 1 | 1 |
| 10 sec gel, Lbs/100 ft$^2$ | 24 | 18 | 4 | 1 | 1 |
| Apparent Visc., cPs | 53 | 51 | 48 | 24 | 21 |
| Plastic Visc., cPs | 32 | 35 | 44 | 21 | 21 |
| Yield Point, Lbs/100 ft$^2$ | 42 | 32 | 7 | 6 | −1 |

Discussion of Results: Table 1 shows, that the organophilic clay loses its ability to suspend and transport cuttings and barites after 350° F. This is seen by the low of 6 and 3 rpm rheology as well as the 10 sec gel results.

TABLE 2

High Temperature Rheology Modifier
Additive: Organoclay Made Using hectorite and 75 wt. % 2M2HT:25 wt. % Ethoquad 18/25 (95 ME)

| Drilling Fluid Formulation Used | Lbs/BBL |
|---|---|
| IAO (C16–V18 Blend) | 186 |
| Invermul NT | 4 |
| EZ Mul NT | 8 |
| Brine (30%) | 75 |
| Lime | 4 |
| Test Material A | 12 |
| Barite | 215 |

TEST RESULTS

| OFI 800 Viscosity @ 120° F. | Initial | HR 300° F. | HR 350° F. | HR 400° F. | HR 450° F. |
|---|---|---|---|---|---|
| 600 RPM READING, cPs | 80 | 95 | 96 | 86 | 97 |
| 300 RPM READING, cPs | 51 | 57 | 62 | 58 | 59 |
| 200 RPM READING, cPs | 40 | 44 | 48 | 47 | 46 |
| 100 RPM READING, cPs | 27 | 31 | 32 | 35 | 31 |
| 6 RPM READING, cPs | 11 | 12 | 12 | 17 | 12 |
| 3 RPM READING, cPs | 9 | 11 | 11 | 15 | 11 |
| 10 sec gel, Lbs/100 ft$^2$ | 9 | 11 | 11 | 15 | 11 |

TABLE 2-continued

High Temperature Rheology Modifier
Additive: Organoclay Made Using hectorite and 75 wt. % 2M2HT:25 wt. %
Ethoquad 18/25 (95 ME)

| | | | | | |
|---|---|---|---|---|---|
| Apparent Visc., cPs | 40 | 48 | 48 | 41 | 49 |
| Plastic Visc., cPs | 29 | 38 | 34 | 24 | 38 |
| Yield Point, Lbs/100 ft $^2$ | 22 | 19 | 28 | 34 | 21 |

Discussion of Results: Table 2 shows that the inventive compositions maintain rheological properties through 450° F. As seen in the 6 and 3 rpm readings, as well as the 10 sec gel, there is no reduction of low shear rate viscosity through 450° F. These measured values are obvious to those familiar with the industry as the low shear rate viscosity necessary to maintain cuttings and barite suspension and transport.

gel, there is no reduction of low shear rate viscosity through 500° F. These measured values are obvious to those familiar with the industry as the low shear rate viscosity necessary to maintain cuttings and barite suspension and transport.

TABLE 3

High Temperature Rheology Modifier
Organoclay made using hectorite and Varisoft 5TD

| Drilling Fluid Formulation Used | Lbs/BBL |
|---|---|
| IAO (C16–V18 Blend) | 186 |
| Invermul NT | 4 |
| EZ Mul NT | 8 |
| Brine (30%) | 75 |
| Lime | 4 |
| Test Material B | 12 |
| Barite | 215 |

TEST RESULTS

| OFI 800 Viscosity @ 120° F. | Initial | HR 300° F. | HR 350° F. | HR 400° F. | HR 450° F. | HR 500° F. | HR 550° F. |
|---|---|---|---|---|---|---|---|
| 600 RPM READING, cPs | 102 | 95 | 115 | 153 | 85 | 161 | 195 |
| 300 RPM READING, cPs | 61 | 56 | 69 | 92 | 48 | 99 | 116 |
| 200 RPM READING, cPs | 46 | 43 | 52 | 70 | 36 | 74 | 84 |
| 100 RPM READING, cPs | 29 | 29 | 33 | 44 | 22 | 46 | 50 |
| 6 RPM READING, cPs | 8 | 11 | 10 | 9 | 10 | 12 | 10 |
| 3 RPM READING, cPs | 7 | 10 | 9 | 8 | 9 | 11 | 9 |
| 10 sec gel, Lbs/100 ft $^2$ | 7 | 10 | 9 | 8 | 9 | 11 | 9 |
| Apparent Visc., cPs | 51 | 48 | 58 | 77 | 43 | 81 | 98 |
| Plastic Visc., cPs | 41 | 39 | 46 | 61 | 37 | 62 | 79 |
| Yield Point, Lbs/100 ft $^2$ | 20 | 17 | 23 | 31 | 11 | 37 | 37 |

Discussion of Results: Table 3 shows that the inventive compositions maintain rheological properties through 500° F. As seen in the 6 and 3 rpm readings, as well as the 10 sec

EXAMPLE 2

A ladder series of organic cation mixtures were used to react with hectorite to form organoclays in the same drilling fluid formulation used in Table 2 and the results obtained are shown in Table 4.

TABLE 4

High Temperature Rheology Modifier

| Additive | 95% 2M2HT/5% Ethoquad 18/25 | | | 90% 2M2HT/10% Ethoquad 18/25 | | | 85% 2M2HT/15% Ethoqouad 18/25 | | |
|---|---|---|---|---|---|---|---|---|---|
| OFI 800 Viscosity @ 120° F. | Initial | HR 350° F. | HR 450° F. | Initial | HR 350° F. | HR 450° F. | Initial | HR 350° F. | HR 450° F. |
| 600 RPM READING, cPs | 112 | 120 | 60 | 100 | 138 | 71 | 79 | 118 | 81 |
| 300 RPM READING, cPs | 75 | 71 | 32 | 66 | 98 | 39 | 48 | 78 | 41 |
| 200 RPM READING, cPs | 62 | 53 | 23 | 54 | 71 | 28 | 38 | 64 | 28 |
| 100 RPM READING, cPs | 47 | 33 | 13 | 41 | 49 | 17 | 27 | 45 | 15 |
| 6 RPM READING, cPs | 25 | 10 | 3 | 21 | 15 | 5 | 11 | 22 | 2 |
| 3 RPM READING, cPs | 23 | 9 | 2 | 19 | 14 | 4 | 10 | 19 | 1 |
| 10 sec gel, Lbs/100 ft $^2$ | 23 | 9 | 2 | 19 | 14 | 4 | 10 | 19 | 1 |
| Apparent Visc., cPs | 56 | 60 | 30 | 50 | 69 | 36 | 40 | 59 | 41 |

TABLE 4-continued

| High Temperature Rheology Modifier | | | | | | | | | |
|---|---|---|---|---|---|---|---|---|---|
| Plastic Visc., cPs | 37 | 49 | 28 | 34 | 40 | 32 | 31 | 40 | 40 |
| Yield Point, Lbs/100 ft $^2$ | 38 | 22 | 4 | 32 | 58 | 7 | 17 | 38 | 1 |

| Additive | 85% 2M2HT/15% Ethoquad 18/25 | | | 80% 2M2HT/20% Ethoquad 18/25 | | |
|---|---|---|---|---|---|---|
| OFI 800 Viscosity @ 120° F. | Initial | HR 350° F. | HR 450° F. | Initial | HR 350° F. | HR 450° F. |
| 600 RPM READING, cPs | 79 | 118 | 81 | 80 | 96 | 97 |
| 300 RPM READING, cPs | 48 | 78 | 41 | 51 | 62 | 59 |
| 200 RPM READING, cPs | 38 | 64 | 28 | 40 | 48 | 46 |
| 100 RPM READING, cPs | 27 | 45 | 15 | 27 | 32 | 31 |
| 6 RPM READING, cPs | 11 | 22 | 2 | 11 | 12 | 12 |
| 3 RPM READING, cPs | 10 | 19 | 1 | 9 | 11 | 11 |
| 10 sec gel, Lbs/100 ft $^2$ | 10 | 19 | 1 | 9 | 11 | 11 |
| Apparent Visc., cPs | 40 | 59 | 41 | 40 | 48 | 49 |
| Plastic Visc., cPs | 31 | 40 | 40 | 29 | 34 | 38 |
| Yield Point, Lbs/100 ft $^2$ | 17 | 38 | 1 | 22 | 28 | 21 |

| Additive | 75% 2M2HT/25% Ethoquad 18/25 | | | 50% 2M2HT/50% Ethoquad 18/25 | | |
|---|---|---|---|---|---|---|
| OFI 800 Viscosity @ 120° F. | Initial | HR 300° F. | HR 450° F. | Initial | HR 300° F. | HR 450° F. |
| 600 RPM READING, cPs | 92 | 92 | 149 | 79 | 122 | 135 |
| 300 RPM READING, cPs | 56 | 54 | 107 | 44 | 73 | 102 |
| 200 RPM READING, cPs | 42 | 42 | 92 | 32 | 55 | 88 |
| 100 RPM READING, cPs | 29 | 27 | 74 | 18 | 35 | 72 |
| 6 RPM READING, cPs | 11 | 11 | 48 | 5 | 8 | 47 |
| 3 RPM READING, cPs | 10 | 10 | 46 | 4 | 7 | 44 |
| 10 sec gel, Lbs/100 ft $^2$ | 10 | 10 | 46 | 4 | 7 | 44 |
| Apparent Visc., cPs | 46 | 45 | 75 | 40 | 61 | 68 |
| Plastic Visc., cPs | 36 | 38 | 42 | 35 | 49 | 33 |
| Yield Point, Lbs/100 ft $^2$ | 20 | 16 | 65 | 9 | 24 | 69 |

Ethoquad 18/25 = octadecyl methyl [ethoxylated (15)] ammonium chloride

Discussion of Results:

Table 4 shows that the inventive composition provides the highest viscosity after the drilling fluid is subjected to 450° F. at a ratio whereby the ethoxylated quat is at least 25% of the total quat. Between 20% and 25% ethoxylated quat a stable drilling fluid is achieved. Between 25% and 50% ethoxylated quat the most effective viscosity build after 450° F. is established. Below 20% ethoxylated quat high temperature stability is not achieved. The 6 and 3 rpm shear rate viscosity is obvious to those familiar to the industry as the low shear rates viscosity necessary to maintain cuttings and barite suspension and transport.

EXAMPLE 3

A series of tests were run to show the most effective range of molar equivalents. Hectorite with a cation exchange capacity of approximately 95 was utilized (as determined by the ammonium acetate method). The results are shown in Table 5.

TABLE 5

Effects of ME on Varisoft STD Organoclay's Performance in an invert emulsion drilling fluid
12 lbs/bbl Additive 80:20; 12 ppg
Hot Rolled for 16 Hours

| | 85 ME | | 95 ME | | 105 ME | |
|---|---|---|---|---|---|---|
| OFI 800 Viscosity @ 120° F. | Initial | HR 450° F. | Initial | HR 450° F. | Initial | HR 450° F. |
| 600 RPM READING, cPs | 76 | 58 | 85 | 85 | 83 | 65 |
| 300 RPM READING, cPs | 43 | 30 | 51 | 54 | 50 | 34 |
| 200 RPM READING, cPs | 34 | 22 | 38 | 40 | 38 | 24 |
| 100 RPM READING, cPs | 21 | 12 | 24 | 25 | 25 | 14 |
| 6 RPM READING, cPs | 7 | 3 | 9 | 7 | 10 | 3 |
| 3 RPM READING, cPs | 6 | 2 | 8 | 6 | 9 | 2 |
| 10 Sec Gel, Lbs/100 ft $^2$ | 6 | 2 | 8 | 6 | 9 | 2 |
| Apparent Visc., cPs | 38 | 29 | 42.5 | 42.5 | 41.5 | 32.5 |
| Plastic Visc., cPs | 33 | 28 | 34 | 31 | 33 | 31 |
| Yield Point, Lbs/100 ft $^2$ | 10 | 2 | 17 | 23 | 17 | 3 |

ME = Total ME of both quaternaries, ME ratio of first quaternary was approximately ⅓ of the total ME.

Discussion of Results:

Table 5 shows that the inventive composition provides a most effective thermally stable drilling fluid when the milliequivalent ratio (ME) is greater then 85 ME and less then 105 ME. At 85 ME and below, viscosity is not maintained as well after dynamically heat aging at 450° F. At 105 ME and above, viscosity is not maintained as well after dynamically heat aging at 450° F. When the ME is 95 a thermally stable drilling fluid is achieved. The 6 and 3 rpm shear rate viscosity is obvious to those familiar to the industry, as the low shear rates viscosity necessary to maintain cuttings and barite suspension and transport. We define "about equal to the cation exchange capacity" to mean from 10 ME above to 10 ME below the cation exchange capacity of the clay used.

EXAMPLE 4

A series of tests were run to compare the performance of bentonite with hectorite in the making of an organoclay and the results obtained are shown in Table 6.

TABLE 6

Effects of Clay Stock (Bentonite vs Hectorite) on the Performance of Organoclays
In Invert Emulsion Drilling Fluids
Hot Rolled for 16 Hours
12 lbs/bbl Additive - 80:20; 12 ppg
95 ME*

| OFI 800 Viscosity @ 120° F. | Ethoquat 18/25: 2M2HT (25:75)/bentonite | | | Varisoft 5TD/bentonite | | | Ethoquad 18/25:2M2HT (25:75)hectorite | | | |
|---|---|---|---|---|---|---|---|---|---|---|
| | Initial | HR 300° F. | HR 350° F. | Initial | HR 300° F. | HR 350° F. | Initial | HR 300° F. | HR 350° F. | HR 450° F. |
| 600 RPM READING, cPs | 51 | 132 | 70 | 46 | 111 | 43 | 63 | 85 | 148 | 77 |
| 300 RPM READING, cPs | 29 | 84 | 39 | 24 | 68 | 21 | 36 | 54 | 92 | 48 |
| 200 RPM READING, cPs | 22 | 66 | 28 | 16 | 51 | 15 | 28 | 42 | 70 | 36 |
| 100 RPM READING, cPs | 13 | 47 | 15 | 9 | 34 | 8 | 19 | 28 | 45 | 26 |
| 6 RPM READING, cPs | 3 | 19 | 2 | 2 | 11 | 2 | 6 | 11 | 10 | 9 |
| 3 RPM READING, cPs | 2 | 17 | 1 | 1 | 9 | 1 | 5 | 10 | 8 | 8 |
| 10 Sec Gel, Lbs/100 ft^2 | 2 | 10 | 1 | 1 | 9 | 1 | 5 | 10 | 8 | 8 |
| Apparent Visc., cPs | 25.5 | 66 | 35 | 23 | 55.5 | 21.5 | 31.5 | 42.5 | 74 | 38.5 |
| Plastic Visc., cPs | 22 | 48 | 31 | 22 | 45 | 22 | 27 | 31 | 56 | 29 |
| Yield Point, Lbs/100 ft^2 | 7 | 36 | 8 | 2 | 21 | -1 | 9 | 23 | 36 | 19 |

ME Ratio was the total of both quaternaries

Discussion of Results:

Table 6 shows that the inventive composition provides a thermally stable drilling fluid when the clay used is hectorite. When bentonite is used, viscosity is not maintained after dynamically heat aging at 350° F. and above. When hectorite is used a thermally stable drilling fluid, stable through 450° F. is achieved. The 6 and 3 rpm shear rate viscosity is obvious to those familiar to the industry, as the shear rates key to maintaining cuttings and barite suspension and transport.

The foregoing background, description and examples have been set forth merely to illustrate the invention and are not intended to be limiting. Since many modifications and simple changes of the disclosed embodiments incorporating the spirit and substance of the invention may occur to persons skilled in the art, the invention should be construed to include everything within the scope of the appended claims, equivalents. Thereof and obvious variations thereof.

What is claimed is:

1. An organophilic clay additive for oil based drilling fluids providing such fluids with improved temperature stable rheological properties comprising the reaction product of:

a) hectorite clay having a cation exchange capacity of at least 75 milliequivalents per 100 grams of clay, 100% active clay basis; and d) a first organic cation provided by an alkoxylated quaternary ammonium salt; and e) a second organic cation wherein such second organic cation is not provided by an alkoxylated quaternary ammonium salt;

wherein the second organic cation is present in an amount of from 25% to about 75% by weight of the total organic cation content, and the total amount of organic cations b) and c) is about equal to the cation exchange capacity of the hectorite clay.

2. The additive of claim 1, wherein said first organic cation is provided by a compound selected from the group having the following formula:

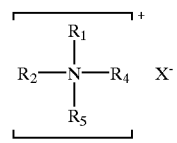

wherein N is nitrogen, X is chloride, $R_1$=a $C_{12}$ to $C_{18}$ linear alkyl group, $R_2$=$R_1$ or methyl; $R_3$ =methyl or $R_4$ and $R_4$=($CH_2$—$CH_2O$)$_y$ H where y=4 to 12.

3. The additive of claim 2 wherein said first organic cation contains one or two linear alkyl groups having 12 to 18 carbon atoms, one or two methyl groups and $R_4$=($CH_2$—$CH_2$ O)y H; where y=4 to 12.

4. The additive of claim 1 wherein the second organic cation is more than 50% of the amount of weight of the total organic cation content.

5. The additive of claim 1 wherein said second organic cation is selected from the group consisting of 2M2HT, MB2HT and M3HT.

6. The additive of claim 1, wherein said hectorite clay is beneficiated hectorite clay.

7. An oil based drilling fluid with less temperature dependent Theological properties which comprises:

a) an oil based drilling fluid composition; and b) an organophilic clay gellant comprising the reaction product of:
i) a hectorite clay having a cation exchange capacity of at least 75 milliequivilants per 100 grams of clay 100% active clay basis;

iv) a first organic cation provided by an alkoxylated quaternary ammonium salt; and
v) a second organic cation wherein such second organic cation is not provided by an alkoxylated quaternary ammonium salt;
wherein the second organic cation is present in an amount of from 25% to about 75% by weight of the total organic cation content and the total amount of b)ii) and b) iii) is about equal to the cation exchange capacity of the hectorite clay.

8. The drilling fluid of claim 7, wherein said organophilic clay gellant is present in an amount of about 0.01% to about 15% based on the total weight of said fluid system.

9. An oil based drilling fluid with less temperature dependent rheological properties comprising:
a) an oil based drilling base fluid composition,
b) one or more organoclays prepared by the reaction of hectorite clay with a first quaternary ammonium compound not an alkoxylated salt and a second quaternary ammonium compound having the chemical formula:

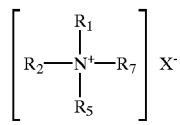

where $R_1$=a $C_{12}$ to $C_{18}$ linear alkyl group, $R_2$=$R_1$ or methyl, $R_5$=methyl or $R_7$, and $R_7$=$(CH_2—CH_2O)_y$H where y=4 to 8 and N is nitrogen and $X^-$ is chloride;
wherein the first quaternary ammonium compound is present in an amount of from 25% to about 75% by weight of the total quaternary ammonium compound content, and the total amount of the quaternary ammonium compound is about equal to the cation exchange capacity of the hectorite clay.

10. The fluid of claim 8 wherein the organoclay is the reaction product of hectorite clay selected from the group consisting of crude hectorite, natural hectorite, beneficiated hectorite, synthetic hectorite, spray dried hectorite and mixtures thereof.

11. The fluid of claim 9 wherein the hectorite clay is beneficiated hectorite.

12. The fluid of claim 9 wherein the viscosity of the fluid measured by a test selected from the group consisting of apparent viscosity, plastic viscosity and yield point is less effected by temperature in excess of 350° F. than drilling fluids containing organoclays made using quaternary ammonium compounds not containing alkoxylated salts.

13. The fluid of claim 9 wherein the quaternary organic compound not an alkoxylated salt is selected from the group consisting of 2M2HT, NM2HT and M3HT.

14. The fluid of claim 9 wherein the organoclay of b) comprises from 0.3% to 5% based on the total weight of the fluid.

15. A process for providing less temperature dependent rheological properties to an oil based drilling fluid comprising
(1) preparing an oil based drilling fluid base composition; and
(2) incorporating into such a drilling fluid base composition one or more additives of claim 1.

16. A process for providing less temperature dependent rheological properties to an oil based invert emulsion drilling fluid comprising
(1) preparing an oil based invert emulsion drilling fluid base composition; and
(2) incorporating into such drilling fluid base composition one or more additives of claim 5.

* * * * *

UNITED STATES PATENT AND TRADEMARK OFFICE
CERTIFICATE OF CORRECTION

PATENT NO.    : 6,462,096 B1                                     Page 1 of 1
DATED         : October 8, 2002
INVENTOR(S)   : David Dino et al.

It is certified that error appears in the above-identified patent and that said Letters Patent is hereby corrected as shown below:

<u>Column 18,</u>
Line 62, change "Theological" to -- rheological --.

Signed and Sealed this

Eleventh Day of March, 2003

JAMES E. ROGAN
*Director of the United States Patent and Trademark Office*